United States Patent Office 3,538,795
Patented Nov. 10, 1970

3,538,795
CUTTING TOOL
Merrill G. Fout, South Solon, Ohio
(721 Springfield St., P.O. Box 893, Dayton, Ohio 45401)
Filed Apr. 22, 1968, Ser. No. 723,178
Int. Cl. B23b 29/03
U.S. Cl. 77—58          7 Claims

ABSTRACT OF THE DISCLOSURE

A cutting tool for undercutting a recess in a workpiece in which a cutting tool bit is pivotally carried by a tool arbor and automatically swings outwardly with respect to the arbor axis as the arbor is moved axially with relative rotation of the workpiece and the tool arbor.

BACKGROUND OF THE INVENTION

This invention pertains to a cutting tool and more particularly to a tool for undercutting a recess in a workpiece.

In undercutting a recess in a workpiece to provide a relief where the cylindrical wall of the recess joins the bottom, it has been the practice to meticulously and carefully feed a pointed cutting tool into the recess requiring an angular feed as well as a feed in the direction of the axis of the tool. Such a sharp intersection or a relief recess at the point of intersection between the annular wall and the end wall is a desirable feature in many instances especially where there is an interfitting part in which the edge of the part itself is sharp.

SUMMARY OF THE INVENTION

Where the cylindrical wall of a recess joins the end wall of the recess there is ordinarily a fillet of some sort, which may be removed by using a tool in accordance with the present invention. The cutting bit of the tool automatically moves outwardly on the arbor that carries the tool as the arbor is fed in an axial direction. The arbor and the workpiece are relatively rotated. The arbor might be carried on the spindle of a jig boring machine for example, in which the tool is the part that is rotated. The arbor of the tool carries a pivotally supported toolholder which in turn carries a tool bit that extends angularly with respect to the arbor axis. Thus the end of the tool may contact the bottom wall of the recess in a cutting operation and when it does it will be swung outwardly in a pivotal manner on the arbor as the arbor is moved axially into the recess. This causes the cutting edge of the tool to form a small groove and remove the filleted portion that is ordinarily at the bottom end of the recess.

It is therefore an object of the present invention to provide a cutting tool in which the tool bit may be adjusted outwardly into a desired position on a toolholder, the toolholder being pivotally supported on an arbor to swing about an axis transverse of the arbor axis, there being spring means to normally maintain the cutting edge of the tool in a retracted position. Such a device permits undercutting at the filleted portion of a blind hole merely by axial movement of the work arbor upon relative rotation of the work and the arbor.

BRIEF DESCRIPTION OF THE DRAWING

In the accompanying drawing.

DESCRIPTION OF THE PREFERRED EMBODIMENT

Figure 1:
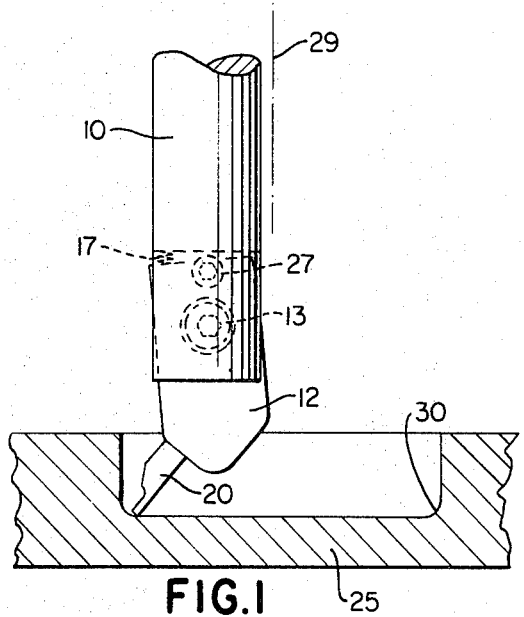
FIG. 1 is a side elevation of the lower portion of a tool holding arbor showing the cutting edge of the tool ready to start the cutting operation on the workpiece.
Figure 2:
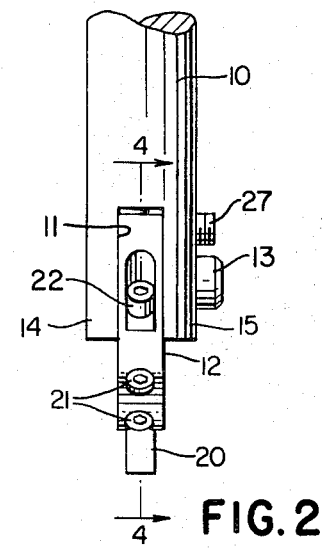
FIG. 2 is a side elevation of the tool shown in FIG. 1.

In the embodiment chosen to illustrate the present invention, a tool arbor 10 as shown in FIG. 1, is provided with a slot 11 at the end of the arbor and in the slot is a toolholder 12 carried by a pivot bar 13 aligned with the axis of the arbor which extends through an opening in one of the bifurcation arms 14 and is threaded in the opposing arm 15 of the arbor end. Thus the toolholder 12 is snugly but freely supported to swing about an axis extending transversely of the arbor axis. At the upper end of the toolholder is a spring 17 that normally holds the toolholder in a retracted position as illustrated at FIG. 1 biasing it against movement in reaction to engagement of the tool with the workpiece. The end of the spring is carried in a recess 18 in the toolholder and the toolholder and the upper end of the spring engages the arbor at one side of the pivot axis 13 as illustrated.

At the lower end of the toolholder 12 is a tool bit 20 projecting at an angle of about 45° to the axis of the arbor 10. This tool bit, as shown, is a square bar held in place by set screws 21 which are threaded in the toolholder as clearly illustrated in FIG. 4. Endwise adjustment of the tool bit is afforded and its adjusted position controlled by a locating screw 22 having a head that engages the end of the tool bit. The screw 22 is threaded in the toolholder and moves in the direction of the longitudinal axis of the tool bit as will be apparent. The lower end of the tool bit has a cutting edge 24 offset from the axis of the arbor that extends at an angle of about 45° to the axis of the arbor so that it can cut a small groove having side walls and an end wall which are at 45° to the tool arbor axis as will be more apparent from FIG. 3 of the drawing which shows the finished groove in the workpiece 25.

Figure 3:
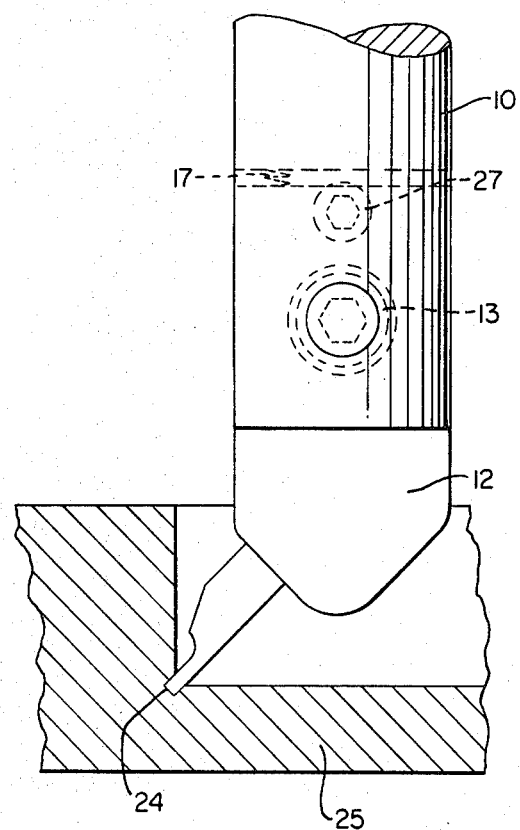
FIG. 3 is an enlarged view of the lower portion of the tool showing it in its final cutting position.
Figure 4:
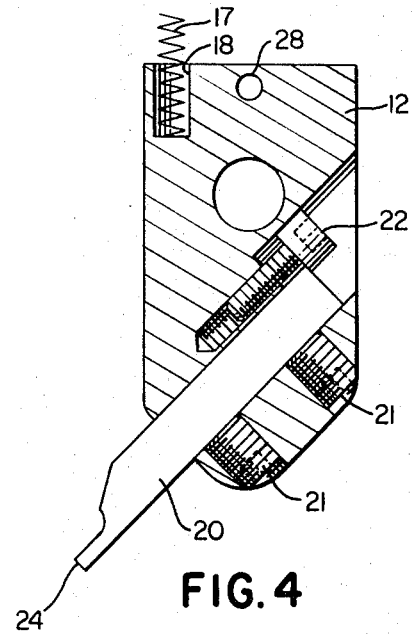
FIG. 4 is an enlarged sectional view taken on the line 4—4 of FIG. 2.

Near the pivot 13 on the arbor arm 14 is a tapped hole that receives a set screw 27, extending parallel to the pivot 13. The inner end of this set screw 27 is pointed and can extend in a small hole 28 at the upper end of the toolholder to hold the toolholder fixed in an axial alignment with the lower end of the arbor 10 for setup purposes. The amount of toolholder retraction caused by spring 17 can be regulated by the amount that the set screw 27 is withdrawn from hole 28. Either the tool or the work may be rotated but the invention will be described in the case where the tool is rotated by the head of a machine tool such as a jig boring machine. In such a machine the tool arbor may be rotated about an axis 29 corresponding to the central axis of the blind hole provided in the workpiece 25. This blind hole has a fillet 30. Having first released the set screw 27 so that the toolholder can swing pivotally from its retracted position, as indicated in FIG. 1, the tool may be fed axially. This swinging movement will start as soon as the bottom of the tool reaches the blind end of the hole and the setup is such that at this point the tool will contact just inwardly of the end of the fillet 30. As the tool is fed downwardly the bottom of the blind hole swings the tool bit and the toolholder in a clockwise direction as viewed in FIG. 1 and this swinging movement continues as the downward movement of the cutting arbor continues until the entire fillet is removed leaving an annular groove as shown in FIG. 3 which extends downwardly and outwardly an equal amount, providing equal floor and wall relief. Although this figure shows the completion of the undercut corresponding to a position in which the toolholder has returned to the initial setup position, it will be apparent that this need not take place and the cutting depth of the tool can be controlled by accurately feeding the tool in an axially direction a measured and definite amount. Of course, as the tool is retracted at the end of a cutting operation, the spring 17 immediately withdraws the cutting tool in a gradual manner.

It will be apparent that with the use of a universal cutting tool of this character, long openings of small diameter may be readily grooved to remove the recess of the bottom of the hole in a convenient manner merely by axial movement of the tool carrying arbor. A tool of this sort may be used either in a machine in which the tool is rotated or in which the work itself is moved while the tool is held stationary. With a tool arrangement of this sort the tool can be conveniently sharpened and adjusted to a desired positioning on the toolholder and different shapes can be given to the cutting end of the tool bit which extends at an angle of about 45° when the tool has finished its cut. It will be apparent that the swinging force generated by axial movement of the tool arbor controls the tool bit in such a way as to provide a recess or groove of the required form.

While the form of the tool herein described constitutes a preferred embodiment of the invention it is to be understood that the invention is not limited to this precise form shown and described and that changes may be made therein without departing from the scope of the invention which is defined in the appended claims.

What is claimed is:

1. A cutting tool comprising:
   an arbor,
   a toolholder pivotally supported on the arbor on an axis transverse of the arbor axis,
   a tool bit having a cutting edge,
   means for adjustably securing the tool bit for positioning the cutting edge at different distances from the arbor axis,
   yielding means normally holding the cutting edge of the tool bit in a retracted position with respect to the arbor axis, in which the cutting edge is located outwardly of the arbor to initially contact the blind end of the work recess inwardly of the outer or annular wall of the recess and outwardly of the outside of the arbor;
   said tool bit extending beyond the end of the arbor and with its cutting edge outward of the pivot axis of the toolholder to automatically swing outwardly against the force of said yielding means to annularly undercut the blind end of a recess in a workpiece as the arbor is moved axially into the recess while the arbor and workpiece are relatively rotated.

2. A cutting tool drive arrangement comprising:
   an arbor;
   a tool;
   means pivotally supporting said tool on said arbor on an axis transverse to the arbor axis;
   a cutting edge formed on said tool and having a portion offset from said arbor axis extending so as to cuttingly engage a work surface extending normal to said arbor axis when said arbor is advanced along its axis, whereby said cutting edge will remove material from a workpiece in a direction parallel to said axis while swinging about said pivotal support to remove material in a direction at an angle to said axis.

3. The arrangement of claim 2 further including means biasing said tool against movement about said pivotal support in response to engagement of said cutting edge portion with a workpiece surface.

4. The arrangement of claim 2 wherein said cutting edge portion is positioned with respect to said pivotal support so as to move downwardly and outwardly substantially at equal rates as said arbor is advanced in a direction along its axis, whereby equal relief in both directions is provided.

5. The arrangement of claim 4 wherein said cutting edge portion extends approximately 45° to said arbor axis to provide said equal relief.

6. The arrangement of claim 2 wherein said pivotal support is aligned with said arbor axis.

7. The arrangement of claim 2 further including means for selectively locking said tool against pivotal movement with respect to said arbor.

References Cited

UNITED STATES PATENTS

| | | | |
|---|---|---|---|
| 864,756 | 8/1907 | Phillips | 77—67 |
| 2,525,216 | 10/1950 | Garrand | 82—24 |
| 2,269,320 | 1/1942 | Rosborough | 77—58 |
| 3,007,353 | 11/1961 | Garnett | 77—58 |
| 3,121,350 | 2/1964 | Warsewa et al. | 77—58 |

OTHER REFERENCES

Publication: American Machinist; Dec. 27, 1923; p. 959.

Publication: American Machinist; July 18, 1946; pp. 144–145.

GERALD D. DOST, Primary Examiner